United States Patent [19]
Welterlin et al.

[11] Patent Number: 6,055,877
[45] Date of Patent: May 2, 2000

[54] POWER SEAT TRACK MOTOR ASSEMBLY

[75] Inventors: Raymond E. Welterlin, Cary; Douglas R. Hilliard, Apex, both of N.C.; Thomas K. Peterreins, Nuremberg, Germany

[73] Assignee: Buehler Products, Inc., Cary, N.C.

[21] Appl. No.: 09/095,940

[22] Filed: Jun. 12, 1998

[51] Int. Cl.[7] .................................. F16H 25/20; A47C 1/022
[52] U.S. Cl. ......................... 74/89.15; 248/429; 297/330; 297/362.11
[58] Field of Search ........................... 74/89.15; 297/330, 297/362.11; 248/429

[56] References Cited

U.S. PATENT DOCUMENTS

| | | |
|---|---|---|
| 2,311,972 | 2/1943 | Simpson . |
| 3,804,460 | 4/1974 | Leffier ................................ 297/330 |
| 4,645,159 | 2/1987 | Terada et al. ......................... 248/429 |
| 4,678,231 | 7/1987 | Chizek . |
| 4,719,810 | 1/1988 | St. Cyr et al. . |
| 4,787,260 | 11/1988 | Bailey . |
| 4,841,790 | 6/1989 | Williston et al. . |
| 4,876,649 | 10/1989 | Kawai et al. ...................... 364/424.05 |
| 4,944,555 | 7/1990 | Brusasco ............................... 297/330 |
| 5,024,486 | 6/1991 | Auel .................................... 297/330 |
| 5,033,566 | 7/1991 | Moretti et al. . |
| 5,090,513 | 2/1992 | Bussinger ......................... 74/89.15 X |
| 5,111,708 | 5/1992 | Brusasco . |
| 5,127,281 | 7/1992 | Yanawgisawa . |
| 5,339,704 | 8/1994 | Lindberg . |
| 5,542,744 | 8/1996 | Bathrick ........................... 297/362.11 |
| 5,556,009 | 9/1996 | Motzko . |
| 5,595,089 | 1/1997 | Watanabe et al. . |
| 5,617,000 | 4/1997 | Mizuta et al. ........................ 318/663 |
| 5,634,376 | 6/1997 | Kitamura . |
| 5,751,129 | 5/1998 | Vergin ................................. 318/467 |
| 5,797,466 | 8/1998 | Gendle ............................... 180/181 |

Primary Examiner—Allan D. Herrmann
Attorney, Agent, or Firm—Jacobson, Price, Holman & Stern, PLLC

[57] ABSTRACT

A power seat track motor assembly controls motion of a seat in a vehicle. The power seat track motor assembly has a motor that has a first axis of rotation, a gear box having gears that turn in response to rotation of the motor, and a threaded screw that turns in response to turning of the gears in the gear box. The threaded screw has a second axis of rotation that is substantially parallel to the first axis of rotation of the motor so that forces imposed on the screw substantially by-pass the motor and gear box. The assembly also has a threaded structure including a threaded hole through which the threaded screw is threadably inserted. Either the threaded screw or the threaded structure is integral with or mechanically linked to the seat, so that rotation of the threaded screw relative to the threaded hole causes the seat to move. The threaded screw is in compression during normal operation so as to bear the forces that are imposed on the screw to substantially by-pass the motor and gear box. At least one compression structure (such as a support column that supports the seat) bears the weight of the seat and the seat's occupant so as to keep the lead screw in compression.

18 Claims, 5 Drawing Sheets

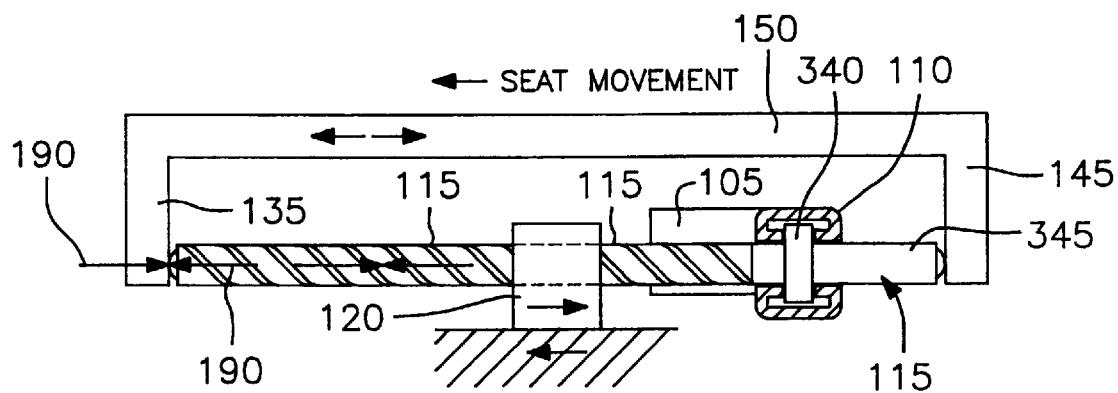
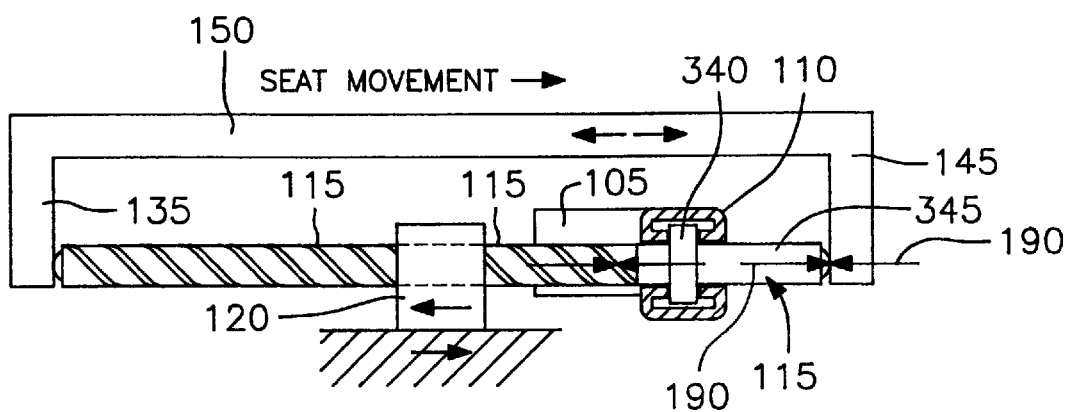

POWER SEAT TRACK MOTOR ASSEMBLY

BACKGROUND OF THE INVENTION

1. Field of the Invention

The present invention relates to motor assemblies. More specifically, the invention relates to motor assemblies for moving seats along seat tracks in vehicles.

2. Related Art

Various systems are known for adjusting the horizontal and vehicle position of seats in vehicles. Typically, DC brush-type motors drive lead screws using a gear box that is situated perpendicular to the lead screw. One end of the lead screw has a drive nut attached to the seat track mechanism, and the other end is contained in the gear box. The gear box is either attached to the motor or is connected to the motor by a flexible shaft.

This conventional arrangement allows high forces on the lead screw to be exerted on the gear box that is oriented perpendicular to the lead screw. These high forces reduce the operating life of the gear box and motor.

Furthermore, using flexible shafts between the motor and gear box generates noise, and frictional forces in the perpendicular gear boxes lead to undesirable "whinnying" sounds.

Thus, there is a need in the art to provide a movable seat track motor assembly in which forces transmitted along a rotatable lead screw are diverted from gear box elements leading to a motor, and in which uneven and undesirable motor sounds are eliminated.

Moreover, some conventional systems have "memory" arrangements for monitoring and remembering the position of the seat. Typically, a potentiometer has been linked to rotation of the lead screw through a gear box of typically 1200:1 gear ratio, so that measuring full travel of a drive nut on the lead screw would correspond to about 200 degrees of rotation of the potentiometer. This arrangement has increased the cost and complexity of measuring the position of a seat by measuring the position of a drive screw.

Therefore, there is a need in the art to provide an simple, cost-effective arrangement in which the position of the seat can be accurately monitored.

It is to fulfill these and other needs in the art that the present invention is directed.

SUMMARY OF THE INVENTION

The invention provides a power seat track motor assembly in which flexible shafts and right-angle gear boxes of conventional systems are avoided. The gear box is an "in-line" gear box with a motor having an axis of rotation substantially parallel to a lead screw. The motor and gear box are not subject to forces exerted on the lead screw, so that all forces are contained within the lead screw and its immediate attachments. A smaller but higher-operating speed motor with a higher gear ratio provides the required power in a smaller package with a more acceptable sound.

The invention provides two embodiments respectively dedicated to horizontal and vertical motion, but certain teachings apply to both embodiments. In particular, the invention provides a power seat track motor assembly for controlling motion of a seat. The power seat track motor assembly has a motor that has a first axis of rotation, a gear box having gears that turn in response to rotation of the motor, and a threaded screw that turns in response to turning of the gears in the gear box. The threaded screw has a second axis of rotation that is substantially parallel to the first axis of rotation of the motor so that forces imposed on the screw substantially by-pass the motor and gear box. The assembly also has a threaded structure including a threaded hole through which the threaded screw is threadably inserted. Either the threaded screw or the threaded structure is integral with or mechanically linked to the seat, so that rotation of the threaded screw relative to the threaded hole causes the seat to move. The threaded screw is in compression during normal operation so as to bear the forces that are imposed on the screw to substantially by-pass the motor and gear box. At least one compression structure (such as a support column that supports the seat) bears the weight of the seat and the seat's occupant so as to keep the lead screw in compression.

Other objects, features and advantages of the present invention will be apparent to those skilled in the art upon a reading of this specification including the accompanying drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which:

" FIGS. 1C and 1D show how the inventive arrangement avoids imposing axial forces on the gear box. Collectively, FIGS. 1A, 1B, 1C, and 1D may be referred to herein as "FIG. 1."

FIG. 4A shows an encoder using a Hall effect sensor in conjunction with a rotating disk having one or more magnets, and FIG. 4B shows an encoder using an optical sensor in conjunction with a rotating disk having one or more specially placed openings through which light may pass.

DETAILED DESCRIPTION OF THE PREFERRED EMBODIMENTS

Figure 1A:
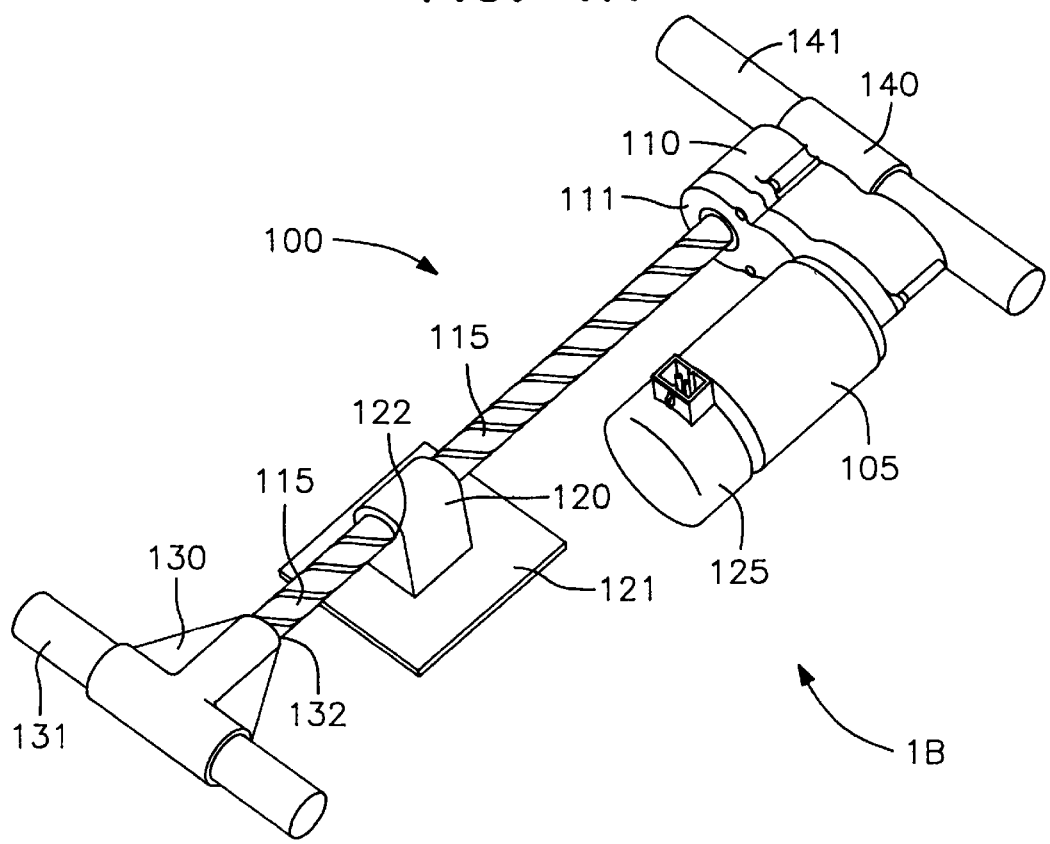
FIG. 1A is perspective view of a preferred embodiment of a horizontal-motion seat track motor assembly in accordance with the present invention.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

Figure 1B:
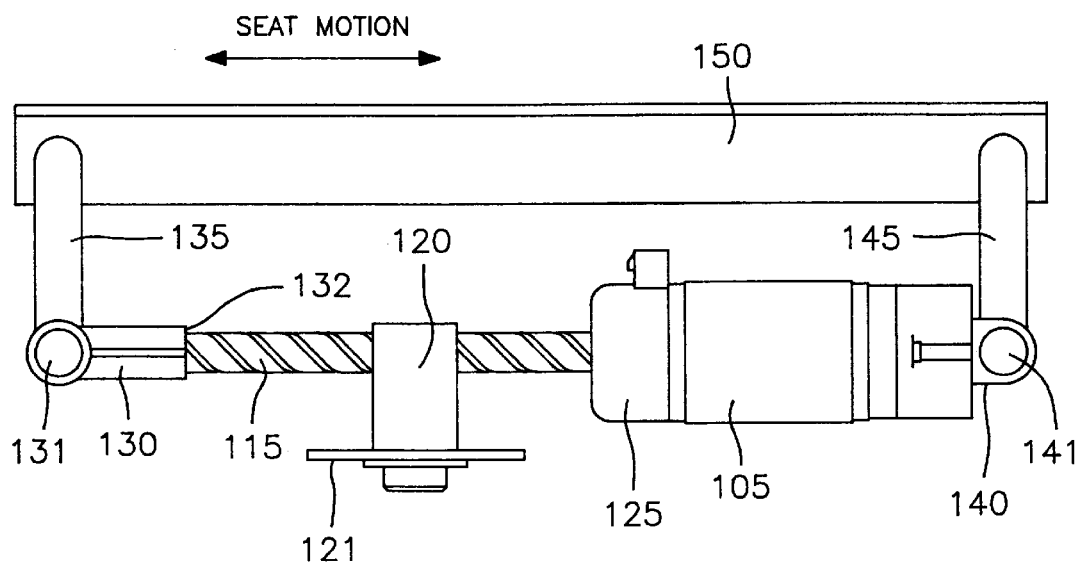
FIG. 1B shows the FIG. 1A horizontal-motion seat track motor assembly installed and as viewed from perspective point "1B.

FIG. 1A is perspective view of a preferred embodiment of a horizontal-motion seat track motor assembly 100 in accordance with the present invention. FIG. 1B shows the FIG. 1A horizontal-motion seat track motor assembly installed and as viewed from perspective point "1B."

Collectively, FIGS. 1A, 1B, 1C, and 1D may be referred to herein as "FIG. 1." Referring to the FIG. 1 embodiment 100, a motor 105 is shown connected via a gear box 110 to a helically-threaded lead screw 115 (whose threads are not specifically shown). Significantly, the axis of rotation of motor 105 is parallel to the axis of rotation of lead screw 115. Motor 105 is provided with a position encoder module 125 that allows the motor's position to be monitored in ways described in greater detail below.

The lead screw is threaded through a threaded hole 122 in a drive nut 120 that is fixed to stationary vehicle chassis 121. The two ends of the lead screw 115 are fixed by bushings 130 and 140 to bars 131 and 141, respectively.

As shown in FIG. 1B, bushing and bar 130, 131 are fixed to a first seat support column 135, while bushing and bar 140, 141 are fixed to a second seat support column 145. Seat support columns 135, 145 support a seat frame 150.

In this arrangement, motor 105, gear box 110, lead screw 115, bushing/bar arrangements 130/131, 140/141, support bars 135, 145, and seat frame 150 form a unit that is movable together with respect to stationary drive nut 120 on vehicle chassis 121. Elements 105, 110, 115, 130/131, 140/141, 135, 145, and 150 may be collectively referred to as a "movable seat assembly."

In operation, when motor 105 causes lead screw 115 to rotate, the threads on the screw engage the threads in the drive nut's hole 122 so that the movable seat assembly moves with respect to the drive nut 120 and vehicle chassis 121. When the motor rotates in a first direction, the movable seat assembly is moved forward; conversely, when the motor rotates in a second direction opposite to the first, the movable seat assembly is moved rearward.

The range of motion of the movable seat assembly is defined by gear box surface 111 and bushing surface 132. Of course, it is possible that the range of motion is limited by other physical means not specifically illustrated. According to the invention, the position of the movable seat assembly is monitored through the use of an encoder module 125, described below in greater detail. Such an encoder module allows the seat to be controllably positioned. Specific positions can be stored in a memory, such as a memory 462 in a suitable control unit 460 (FIG. 4C, to be described below). With this arrangement, different drivers of the vehicle can automatically reposition the seat to respective preferred positions.

FIGS. 1C and 1D show how the inventive arrangement avoids imposing axial forces (arrows 190) on the components of gear box 110. The lead screw 115 is captured on each end between seat members 135, 145. Seat members 135, 145 keep the lead screw in compression, regardless of which direction the screw is turning. The lead screw creates a directional force that depends on the direction of rotation of the motor, but it is seat members 135, 145, rather than the components of the gear box 110, that bear the axial force.

Figure 2A:
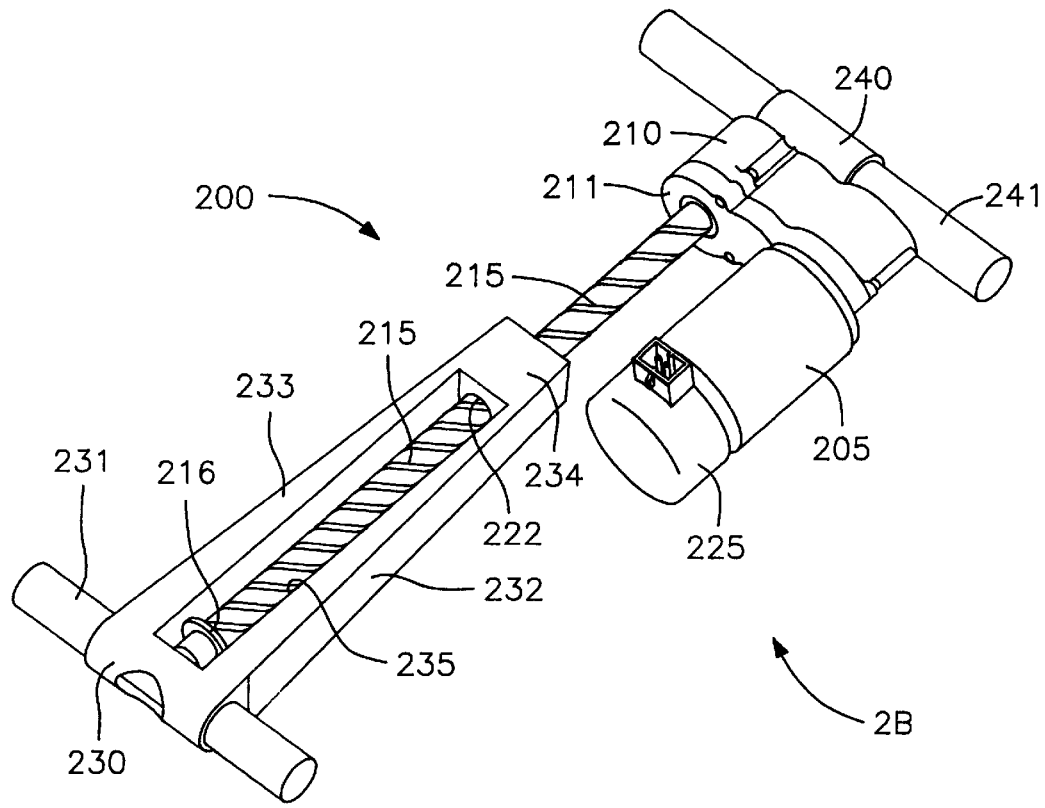
FIG. 2A is perspective view of a preferred embodiment of a vertical-motion seat track motor assembly in accordance with the present invention.
Figure 2B:
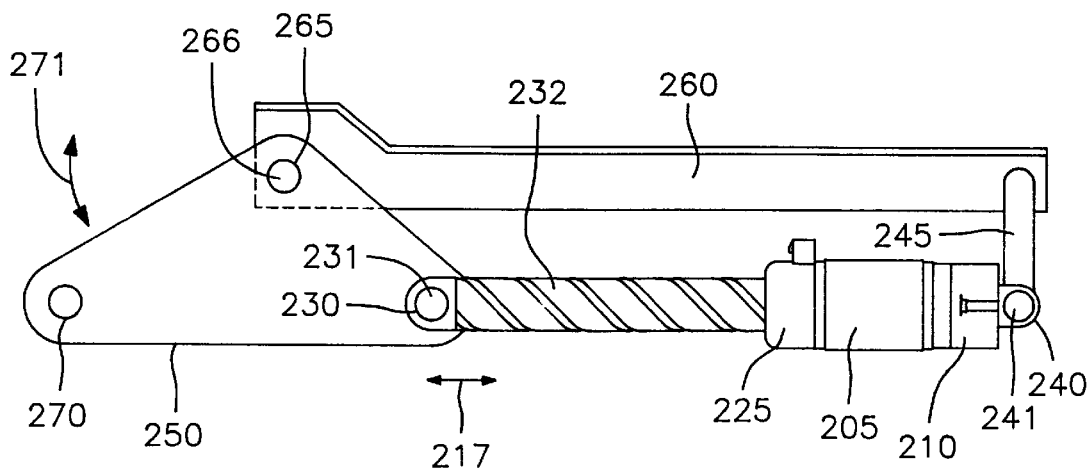
FIG. 2B shows the FIG. 2A vertical-motion seat track motor assembly installed and as viewed from perspective point "2B.

The hardware of an embodiment of a horizontal-motion seat track assembly 100 having been described, an embodiment of a vertical-motion seat track assembly is now described. FIG. 2A is perspective view of a preferred embodiment of a vertical-motion seat track motor assembly 200 in accordance with the present invention. FIG. 2B shows the FIG. 2A vertical-motion seat track motor assembly installed and as viewed from perspective point "2B." In a preferred embodiment, two of the FIG. 2 units are used in order to raise and lower the seat vertically, in contrast to the single unit (in FIG. 1) that is used to move the seat forward and backward horizontally.

Collectively, FIGS. 2A, 2B, 2C and 2D may be referred to herein as "FIG. 2."

Referring to the FIG. 2 embodiment 200, a motor 205 is shown connected via a gear box 210 to a lead screw 215 (whose threads are not specifically shown). Significantly, the axis of rotation of motor 205 is parallel to the axis of rotation of lead screw 215. Motor 205 is provided with a position encoder module 225 that allows the motor's position to be monitored in ways described in greater detail below.

The lead screw 215 is threaded through a threaded hole 222 in a nut portion 234 of bushing assembly 230. Bushing assembly 230 includes two arm portions 232, 233 that extend to nut portion 234. The two arm portions forming an inner space 235 into which the lead screw 215 may fit. One end of lead screw 215 is fixed by a bushing 240 to a bar 241. The opposite end of lead screw 215 has a lug portion 216 that cannot pass through threaded hole 222, and thus prevents the lead screw from completely passing out of the space 235. The end of bushing assembly 230 that is opposite its nut portion 234 is joined to a bar 231.

As shown in FIG. 2B, bushing and bar 240, 241 are fixed to a support column 245 that supports a first end of a motor assembly frame 260. Bar 231, which is preferably cylindrical in shape, is rotatably mounted in a first corner of a hinge plate 250 that is generally triangular in shape. Hinge plate 250 has a pivot point 265 at a second corner thereof, through which a cylindrical pivot bar 266 passes. Pivot bar 266 also passes through motor assembly frame 260, allowing the hinge plate 250 to pivot about the stationary motor assembly frame 260. The third corner of hinge plate 250 has a mounting point 270 to a movable seat assembly that is not specifically shown.

In operation, when motor 205 causes lead screw 215 to rotate, the threads on the screw engage the threads in the drive nut's hole 222 so that the hinge plate 250 rotates about its pivot point 265. When motor 215 rotates in a first direction, the screw rotates in a first direction, causing the hinge plate to pivot in a first direction; conversely, when the motor rotates in a second direction opposite to the first, the screw rotates in a second direction opposite to the first (see FIG. 2B arrows 217). This motion of the screw in first and second directions causes the hinge plate to pivot in a first circumferential direction, or in a second circumferential direction opposite to the first circumferential direction (see first and second circumferential directions indicated by arrows 271). The rotational motion of the hinge plate is translated to a generally vertical motion of the seat assembly (not shown) according to arrows 271.

The range of rotational motion of the lead screw is defined by the point at which the lead screw pulls the hinge plate closest to the end of the lead screw on which gear box is mounted, or, by another design, when the end of lead screw 216 contacts bushing/bar assembly 230/231. In the other direction, the range of rotational motion is determined by the point at which screw lug 216 contacts the nut portion 234 of the bushing assembly. Of course, it is possible that the range of motion is limited by other physical means not specifically illustrated. According to the invention, the position of the lead screw is monitored through use of an encoder module 225, described below in greater detail. Such an encoder module allows the seat to be controllably positioned. Specific positions can be stored in a memory, such as a memory 462 in a suitable control unit 460 (FIG. 4C, to be described below). With this arrangement, different drivers of the vehicle can automatically reposition the seat to respective preferred positions.

Figure 2C:
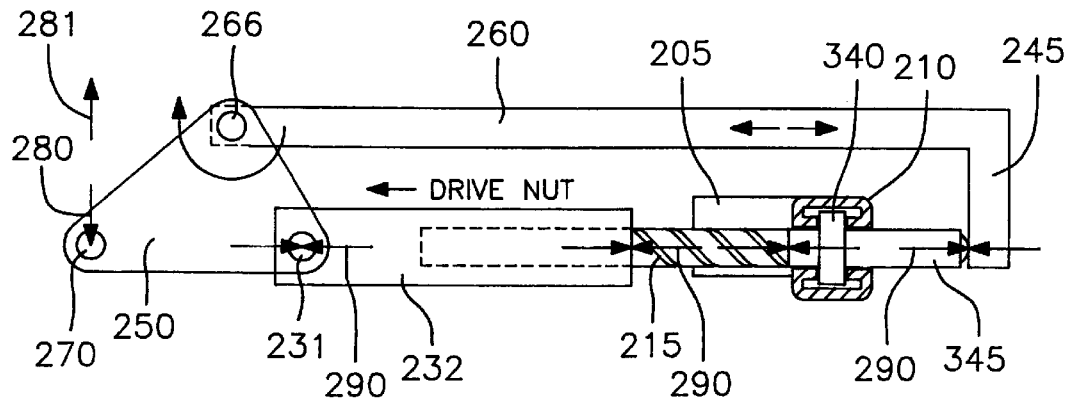
" FIGS. 2C and 2D show how the inventive arrangement avoids imposing axial forces on the gear box. Collectively, FIGS. 2A, 2B, 2C and 2D may be referred to herein as "FIG. 2."
Figure 2D:
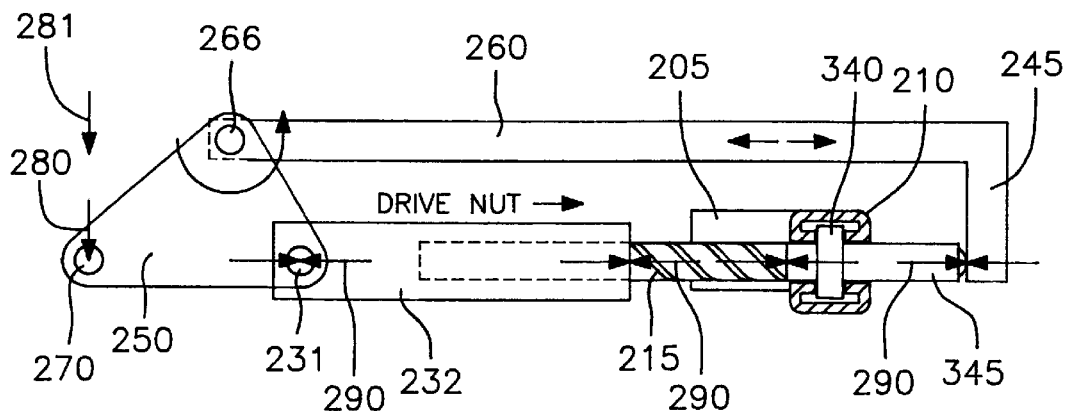

FIGS. 2C and 2D show how the inventive arrangement avoids imposing axial forces (arrows 290) on the components of gear box 210. A first end of the lead screw is captured against a seat member (support column) 245. In this manner, the gear box 210 does not bear any axial force generated while the seat is being lifted. As shown in FIGS. 2C and 2D, the weight of the seat and its occupant (indicated by arrow 280) always holds the lead screw in compression. When the seat is being raised, the weight 280 opposes the force 281 (FIG. 2C) on the lead screw. Conversely, when the seat is being lowered, the weight 280 adds to the force 282 (FIG. 2D) on the lead screw. In either event, the gear box generates torque load that is transmitted to the lead screw, but components of the gear box 210 do not bear any axial force.

Figure 3:
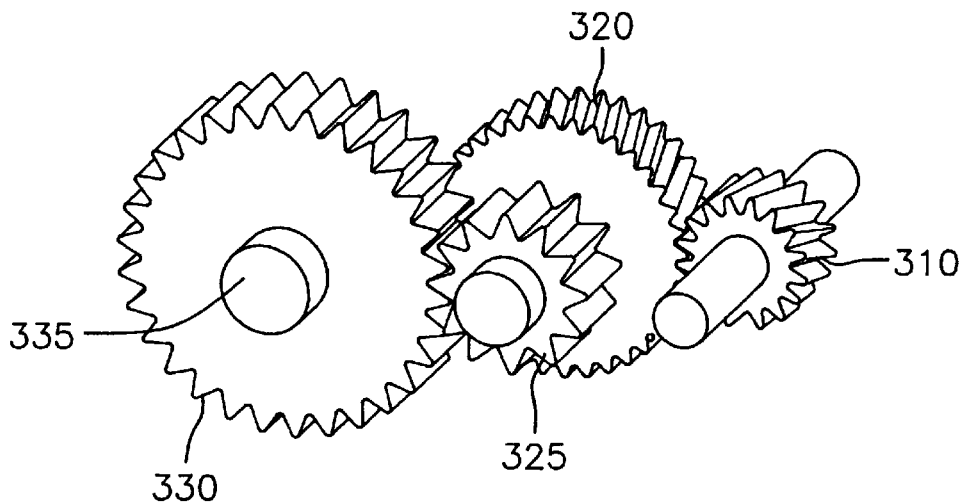
FIG. 3 shows an exemplary arrangement of gears that may be used in the gear box of FIGS. 1A and 2A.

FIG. 3 shows an exemplary arrangement of gears that may be used in the gear box 110 or 210 of FIGS. 1A and 2A, respectively. Referring to FIG. 3, teeth of a motor pinion 310 engage teeth of a second gear 320 that rotates co-axially and integrally with a third gear 325. Teeth of third gear 325 engage the teeth of a fourth gear 330 that has a shaft 335. Teeth of a final output gear can engage teeth of a gear 40 (FIG. 1C) that is mounted with respect to shaft 335 to provide a desired overall gear ratio and corresponding rotation ratio between a motor (205 or 305) and lead screw (115 or 215). The final gear 340 is linked by a press fit to a non-threaded end 345 of the lead screw.

Significantly, the axis of rotation of the motor is parallel to the axis of rotation lead screw. This feature, characteristic of both the FIG. 1 embodiment and the FIG. 2 embodiment, ensures that forces transmitted along the lead screws and their end attachments (bushings, and hinges if present) are not transmitted to the motor itself This advantage is in contrast to conventional arrangements in which the axis of the motor is transverse (perpendicular) to the direction of force exerted, causing motor shafts in the conventional arrangement to experience significant forces that damage them or shorten motor life. According to the invention, the forces are transmitted longitudinally through the lead screw and end attachments only, which do not transmit significant force to the gear box elements or motor.

In a preferred embodiment of the horizontal-motion motor track assembly shown in FIG. 1, the ratio of gears going from the pinion to the output gear is 33:12, 29:12, and 34:11. Multiplying these fractions yields a product of 20.54, indicating an overall gear ratio of 20.54:1. This gear ratio is found to be desirable for horizontal-motion applications of the inventive motor track assembly.

In a preferred embodiment of the vertical-motion motor track assembly shown in FIG. 2, the ratio of gears going from the pinion to the output gear is 38:12, 34:11, and 41:10. Multiplying these fractions yields a product of 40.13, indicating an overall gear ratio of 40.13:1. This gear ratio is found to be desirable for vertical-motion applications of the inventive motor track assembly.

The invention envisions that the gears may be spur gears, and more specifically helical gears. The invention further envisions that the gears may be made of either molded plastic or metal, or that some gears may be made of molded plastic and other gears may be made of metal.

Of course, the invention contemplates use of other embodiments of gear trains, and other gear ratios and ranges of gear ratios, than those specifically shown in FIG. 3 and described above. However, according to the invention, it has been found desirable to design a gear ratio substantially greater than gear ratios employed in conventional systems.

Using the higher gear ratios according to the present invention allow the motor to operate at a higher speed (at least 4000 RPM). Operating the motor at a higher speed provides a consistent, higher-pitch sound that is more pleasing than the "whinnying" sound that is characteristic of certain conventional systems. Moreover, using a gear ratio of at least about 15:1 in the horizontal-motion embodiment (FIG. 1) and at least about 30:1 in the vertical-motion embodiment (FIG. 2) have been shown to increase efficiency from less than fifty percent (50%) in conventional arrangements to about seventy percent (70%) according to the invention. Further, higher gear ratio allows use of a smaller motor that is operated at a higher speed, reducing motor operating torque.

Figure 4A:
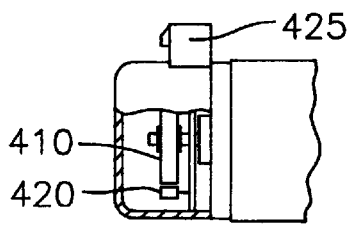
FIGS. 4A and 4B illustrate exemplary motor shaft encoders that may be used in the embodiments of FIGS. 1 and 2.
Figure 4B:
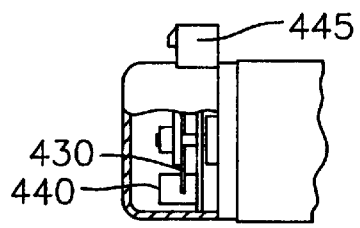
Figure 4C:
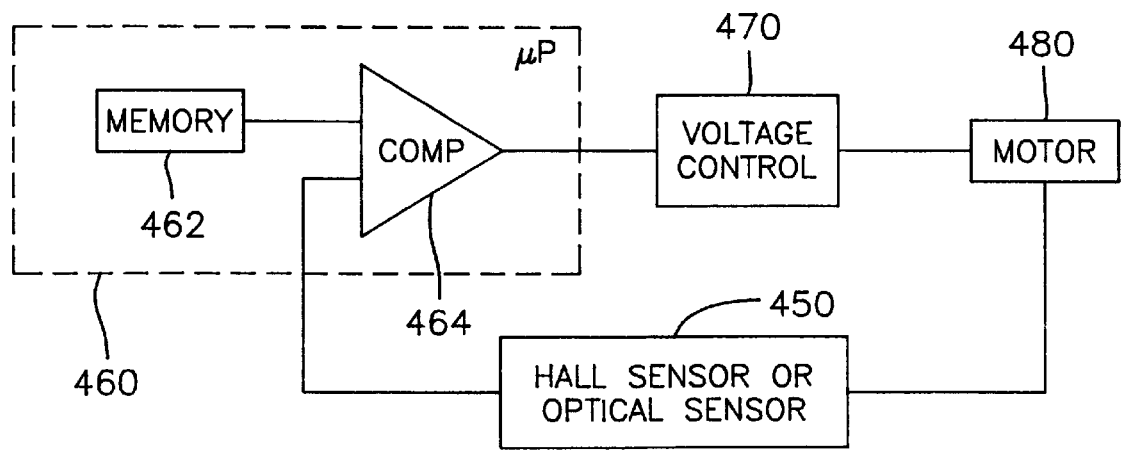
FIG. 4C is a high-level functional drawing showing application of the sensors of FIGS. 4A or 4B in a seat position monitoring arrangement.

FIGS. 4A and 4B illustrate exemplary motor shaft encoders that may be used in the encoder modules 125, 225 of the embodiments of FIGS. 1 and 2. FIG. 4A shows an encoder using a Hall effect sensor 420 in conjunction with a rotating disk 410 having one or more magnetic elements, and FIG. 4B shows an encoder using an optical sensor 440 in conjunction with a rotating disk 430 having one or more specially-placed openings through which light may pass. The sensors have respective cable connectors 425, 445 that allow communication of signals from the sensors to an external device such as a microprocessor (see FIG. 4C).

Referring to FIG. 4A, a disk 410 rotates co-axially with a motor such as element 105 or 205 in FIGS. 1 and 2. Disk 410 is made of a magnetic material having at least one pair of opposing magnetic poles disposed at its outer periphery so that, when the disk rotates, the poles pass Hall effect sensor 420. When a magnet's pole passes the Hall effect sensor, the sensor generates a signal. If only a single magnet, having two poles, is located on the disk, the Hall effect sensor thus sends two position signals per revolution of the motor rotation. Providing additional magnetic poles on the disk allows more position signals to be generated per each rotation, allowing commensurately greater precision in monitoring position of the motor and seat.

With reference to FIG. 4C (discussed below), counting the Hall effect sensor's position signals allows monitoring of the number of times that the motor has rotated, as well as the direction of the motor's rotation. By using a device (such as a microprocessor) with a memory element, it is possible to use the number of rotations of the motor and its direction of rotation to effectively monitor the position of the seat.

Referring to FIG. 4B, a disk 430 rotates co-axially with a motor such as element 105 or 205 in FIGS. 1 and 2. Disk 430 has one or more openings disposed at its outer periphery so that, when the disk rotates, the holes pass optical sensor module 440 allowing light from a light source (such as a light-emitting diode, not shown) to reach the sensor. The optical sensor thus generates a position signal each time an opening passes it.

The optical sensor's position signal can be used in substantially the same way as the Hall effect sensor's position signal as described above. Placing a larger number of openings on the disk allows greater precision in monitoring the rotational position of the motor. The optical sensor module can thus monitor the number of times that the motor has rotated, as well as the direction of the motor's rotation. By using a device (such as a microprocessor) with a memory element, it is possible to use the number of rotations of the motor and its direction of rotation to effectively monitor the position of the seat.

FIG. 4C is a high-level functional drawing showing application of the sensors 420, 440 of FIGS. 4A or 4B. Sensors 420, 440 are referenced as element 450 in FIG. 4C to indicate that element 450 can be embodied as either a Hall Effect sensor or as an optical sensor, or conceivably, a sensor that operates on other principles. In any event, sensor 450 monitors rotation of motor 480, and provides a signal to a microprocessor 460. Microprocessor 460 is shown to include a memory 462 and a comparator 464. The signal from the sensor 450 is compared to an output of memory 462, and the comparison result is used to drive a voltage controller 470. Finally, voltage controller 470 provides a voltage that drives motor 480.

The position of the seat can be continuously monitored by initializing a counter variable when the seat is in a given starting position, and then incrementing or decrementing the counter variable when a position signal from the sensor indicates that the motor has rotated a first direction or second direction, respectively. The variable is incremented in response to a position signal indicating rotation in a first direction, and the variable is decremented in response to a position signal indicating rotation in a direction opposite to the first direction. Thus, at any given time, the value of the variable indicates the seat's position as determined by the history of the motor's rotation.

Modifications and variations of the above-described embodiments of the present invention are possible, as appreciated by those skilled in the art in light of the above teachings. For example, different gears, gear trains, and gear ratios may be employed without departing from the scope of the invention. It is therefore to be understood that, within the scope of the appended claims and their equivalents, the invention may be practiced otherwise than as specifically described.

What is claimed is:

1. A power seat track motor assembly for causing motion of a seat, the assembly comprising:

a motor that has a first axis of rotation;

a gear box having gears that turn in response to rotation of the motor, said motor being secured to the gear box;

a threaded screw on which is mounted the gear box so that the threaded screw turns in response to turning of the gears in the gear box, the threaded screw having a second axis of rotation that is substantially parallel to the first axis of rotation of the motor, the threaded screw having first and second ends;

a first bushing for rotatable receiving the first end of the threaded screw; a second bushing for rotatable receiving the second end of the threaded screw;

a threaded structure including a threaded hole through which the threaded screw is threadably inserted, the threaded structure being movable relative to the seat; and means for mechanically securing at least one of the first and second bushings to the seat, so that rotation of the threaded screw relative to the threaded hole causes the seat's motion.

2. The assembly of claim 1, wherein:

rotation of the threaded screw relative to the threaded hole causes horizontal motion of the seat.

3. The assembly of claim 2, wherein:

the gear box has a gear ratio of at least about 15:1.

4. The assembly of claim 1, wherein:

rotation of the threaded screw relative to the threaded hole causes vertical motion of the seat.

5. The assembly of claim 4, wherein:

the gear box has a gear ratio of at least about 30:1.

6. The assembly of claim 1, wherein:

the gears are spur gears.

7. The assembly of claim 6, wherein:

the spur gears are helical gears.

8. The assembly of claim 1, wherein:

the gears include molded plastic gears.

9. The assembly of claim 1, wherein:

the gears include metal gears.

10. The assembly of claim 1, wherein:

the gears include molded plastic gears and metal gears.

11. The assembly of claim 1, further comprising:

an encoder that includes means for sensing rotation of the motor and providing a position signal at least once per motor rotation.

12. The assembly of claim 11, wherein the encoder includes:

a disk having at least one pair of opposing magnetic poles that rotates in conjunction with the motor; and a Hall effect sensor that responds to motion of the magnetic poles on the disk and provides the position signal at least twice per motor rotation.

13. The assembly of claim 11, wherein the encoder includes:

a disk that rotates in conjunction with the motor, and that has an opening; and an optical sensor that responds to motion of the opening in the disk and provides the position signal at least once per motor rotation.

14. The assembly of claim 1, wherein:

the motor has a rotational velocity of at least about 4000 RPM.

15. The assembly of claim 1, wherein:

the threaded screw is in compression during normal operation so as to bear the forces that are imposed on the screw to substantially by-pass the motor and gear box.

16. The assembly of claim 15, further comprising:

at least one compression structure that abuts the threaded screw so as to keep it in compression.

17. The assembly of claim 16, wherein:

the at least one compression structure bears the weight of the seat and the seat's occupant so as to keep the lead screw in compression.

18. The assembly of claim 16, wherein the compression structure includes:

a support column that supports the seat.

* * * * *